Patented Oct. 9, 1945

2,386,358

UNITED STATES PATENT OFFICE 2,386,358

REAGENT PREPARATION AND USE IN SEPARATION OF UNSATURATED HYDROCARBONS

Walter A. Schulze and Lloyd C. Morris, Bartlesville, Okla., assignors to Phillips Petroleum Company, a corporation of Delaware No Drawing. Application March 23, 1942,
Serial No. 435,895

10 Claims. (Cl. 260—681.5)

This invention relates to a process for the preparation of metal salt reagents useful in the separation of unsaturated hydrocarbons from mixtures containing the same. More specifically, it concerns an improved process for the preparation of inorganic reagents, particularly those comprising cuprous halides, for use in the separation and recovery of unsaturated hydrocarbons from hydrocarbon fluid mixtures. Still more specifically, this invention relates to an improved process for the preparation of cuprous halide reagents wherein the starting material is the corresponding cupric halides, and the cupric salts are reduced by novel and efficient means to the cuprous state. The invention further involves the utilization of reagents so prepared in the separation of unsaturated hydrocarbons.

The thermally-reversible reaction of monovalent salts of metals of Groups I and II of the periodic system with unsaturated hydrocarbons to form complex compounds is known to the art, and a variety of processes have been suggested for the industrial adaptation of this reaction. From economic and other standpoints, the most favorable reagent of the class described is the cuprous halides, particularly the chloride and bromide. These chemicals in various adaptations are relatively efficient in the separation and recovery of various hydrocarbon species including mono and diolefins of the aliphatic series.

The cuprous halides have been proposed for use in a variety of forms such as solutions in aqueous and other solvents, suspensions and/or slurries in suitable liquids, and as the solid chemical either alone or supported on solid inert carriers. Each form of the reagent has been recommended for specific applications, with the solid-type reagent being of particular advantage in offering a large area of reactive surface and in being essentially non-corrosive and less susceptible to oxidation.

However, the preparation of cuprous halide reagents in either solid or liquid form has heretofore been difficult and expensive due to the instability of the cuprous valence state in the presence of moisture and/or oxidizing agents and by the very limited solubility of the cuprous salts in water or other aqueous solutions. Thus, cuprous salts are very easily oxidized to the inoperative cupric form and the preparation of suitably concentrated reagents through the medium of aqueous solutions is difficult when only dilute solutions can be prepared. Also, since the capacity of a reagent for absorption of unsaturated hydrocarbons is limited by its cuprous halide content, the inefficiency of dilute reagents is often detrimental to commercial operations.

The weight relationship between cuprous halide and the unsaturated hydrocarbon which can be absorbed thereby is such that a relatively large weight of inorganic salt is required per unit-weight of hydrocarbon. This may be illustrated by the reaction of cuprous chloride and butadiene forming $C_4H_6 \cdot (CuCl)_2$ in which the weight relationship is over four parts of cuprous chloride to one part of butadiene. When the cuprous chloride is not utilized completely in order to avoid passage of unreacted diolefin, the weight relationship is usually greater than about 5:1 for the pure chemical and is proportionately increased for solid-type reagents by the inclusion of inert ingredients with the cuprous chloride. Thus, it will be seen that, for most efficient results, considering plant equipment size and the quantities of reagent required, it is necessary to use reagents which comprise a large proportion of the active chemical.

A common procedure for impregnation of a solid carrier is to dissolve the active chemical in an aqueous medium, then to apply the resulting solution to the carrier, preferably by spraying the inert carrier with the solution. The cuprous halides, however, are substantially insoluble in water and can be put into solution to the extent of only a few weight per cent by the use of very large proportions of solutizing salts such as hydrogen or alkali metal halides. In the impregnation process it is disadvantageous to allow the solid carrier to become appreciably wet, not only because chemicals are thereby lost, but also, and more important, because a less rugged and uniform reagent is thereby produced. In consideration of this fact, and the small solubility of the cuprous halides, it can be readily understood that it is necessary to repeatedly spray or soak and dry the solid carrier material in order to build up a high cuprous halide content. But such a procedure is frequently detrimental to the mechanical strength and activity of the reagent produced thereby, in addition to being time-consuming and involving prolonged handling of solutions which are instantaneously oxidizable in air. It will be obvious, therefore, that an improved method of preparation of cuprous halide reagents, particularly one in which the unstable cuprous halide can be synthesized in solution or suspension or in place on a solid carrier under non-oxidizing conditions within the reagent vessel in which it is to be used, is highly desirable.

An object of this invention is to provide a process for the preparation of reagents for use in the separation and recovery of unsaturated hydrocarbons from mixtures containing the same. A second object is to supply an improved process for the preparation of cuprous halide reagents for the aforesaid use. A third object is to provide an improved step in a chemical process for the isolation of unsaturated hydrocarbons, particularly olefins and diolefins, from hydrocarbon mixtures. A further object is to increase the efficiency and hence lower the cost of a process of the type described for the manufacture of unsaturated hydrocarbons from petroleum sources, thereby encouraging more extended use of pure petroleum hydrocarbons by the chemical industries.

We have discovered a method whereby cuprous halide reagents for the use under consideration may be synthesized in a reagent tower or treating system ready for use. This method involves the preparation of the reagent in the form of the cupric halides, which are extensively soluble in water, followed by treatment in situ with selected reducing agents to convert the cupric salt to the cuprous form, in which form it is active in the prescribed reaction.

In general terms, our process for preparation of solid-type reagents consists of impregnating an inert, preferably adsorbent, carrier with a highly concentrated cupric halide solution or with a mixture of two solutions which will metathetically interact to form cupric halide, and subsequently converting the cupric halide to cuprous halide by use of a suitable reducing agent. For preparation of a cuprous halide reagent solution or slurry, by our process, a cupric halide solution, prepared by solution of the appropriate chemicals or by metathesis as indicated in the foregoing procedure, is reduced to cuprous halide in the system wherein it is to be used.

Our process has many advantages compared with procedures previously suggested for preparation of the type of reagents herein considered. The unstable cuprous halide is synthesized in the reagent vessel, or within the system, in which it is subsequently to be contacted with olefin or diolefin-containing hydrocarbon feed stock, where non-oxidizing conditions can be maintained, and hence a more reactive reagent is produced, because no oxidation of active chemical is suffered in preparing and transferring the reagent. Repeated spraying and drying of the inert carrier is eliminated by use of cupric salts of such high solubility that a single application of the solution may be adequate, whereas with cuprous halides, even saturated solutions contain only relatively small concentrations of the active chemical. Further, the raw materials used are all cheap and readily available in industrial quantities; for example, in one case, copper sulfate (blue vitriol), common salt, and lower boiling alkyl mercaptans—the latter a by-product in petroleum refining—are employed. Further advantages will be immediately apparent to those familiar with the difficulties involved in use of the methods suggested previously for preparing and using cuprous halide reagents.

Cupric halides are relatively easily reducible to the cuprous form, and it is possible to select reducing agents in gaseous or liquid form which perform the desired function at moderate temperature and pressure. However, it is also necessary to select reducing agents which do not continue the reduction past the cuprous form. Thus, while hydrogen may be used at somewhat elevated temperatures and/or pressures, it is preferred to employ organic or inorganic compounds which are reactive under less drastic conditions and whose action may be more easily controlled to avoid further reduction of the cuprous ion to the metallic state. It is desirable, of course, to employ materials which are easily removable from the reduced reagent and/or which are not harmful to the reagent or the hydrocarbons to be treated. These latter characteristics are of great economic value in eliminating after-treatment of the cuprous halide reagent to remove any excess of the reducing agent and/or the products formed therefrom as a result of the oxidation-reduction reaction.

While a large number of suitable reducing agents may be satisfactory with proper handling, perhaps the most useful materials are those compounds representing easily oxidizable forms of sulfur and nitrogen, e. g. compounds in which sulfur has a valence of less than six and nitrogen has a valence of less than five. Still more specifically of value are compounds of this classification which form innocuous products in the oxidation-reduction reaction and produce substantially only the cupric-cuprous reduction.

Among the sulfur compounds thus represented are sulfur dioxide and/or the sulfites and bisulfites, thiosulfates, and mercaptans. Sulfur dioxide is particularly suitable since it may be used in gaseous form for passage into or through a body of cupric halide reagent, and unreacted gas in the reagent may be swept out with inert gas usually at somewhat elevated temperatures. However, solutions of sulfur dioxide, i. e. sulfites or bisulfites, preferably the latter, are satisfactory for addition to aqueous solutions of cupric halides. In the latter case, any excess of the sulfite or bisulfite may remain in the solution since it serves merely to stabilize the resulting cuprous halide against future oxidation. The sulfur dioxide or sulfites are converted to sulfate form which is substantially inert in the reagent. Thiosulfate solutions are also adaptable to reduction of the cupric ion, with the formation of polythionates which are also substantially inert.

Mercaptans, of general formula R—SH, where R is an organic radical, are also often used in gaseous form, alone or in hydrocarbon vapors to reduce cupric halides. Solutions of mercaptans in hydrocarbon liquids may be preferred in some cases, e. g., when mercaptan-containing light hydrocarbon distillates of suitable composition are available. For this purpose, the lower alkyl mercaptans are most often employed. The mercaptans are converted in the process to disulfide (R—S—S—R) form, and the products may be removed from the reagent by the hydrocarbon fluids or other gas. Elevated temperatures may promote the flushing out of either excess mercaptan solution or of the reaction products; alternately, the hydrocarbon fluid undergoing treatment may be allowed to carry away these organic materials.

Certain other sulfur compounds, such as hydrogen sulfide or salts thereof, are not suitable since the cupric or cuprous ions are converted to the corresponding sulfides and are thus rendered unusable in the present process.

The compounds of nitrogen useful in the process include hydroxylamine, hydrazine (both usually in the form of acid salts), and nitrites. The first two compounds represent negative valence forms of nitrogen, which upon oxidation yield elemental nitrogen and are especially useful for the preparation of the reagents described herein. For exmaple, hydroxylamine hydrochloride in aqueous solution may be utilized to reduce cupric chloride to cuprous chloride, with the formation of substantially no by-product except an inert gas. Nitrites are also useful in the reduction, although nitrogen oxides and/or nitrates are less desirable in the cuprous halide reagents and should be removed by water washing or other suitable means from the reagent and the hydrocarbons undergoing treatment.

Since the cupric halide and the resulting cuprous halides dealt with in the present process are of acidic character, the reducing agents are preferably utilized in acid or essentially neutral form. Thus, bisulfites are preferred to alkali metal sulfites which have an alkaline reaction and may produce some conversion of the copper halide to the oxide. However, such alkaline-reacting agents may be used, if desired, and followed by a treatment with an acidic solution or gaseous acid to restore the pH and composition of the cuprous halide reagent. Such an aftertreatment might involve passage of hydrogen chloride or other volatile acid into or through the reagent as well as the addition in suitable amounts of aqueous acid solution to the cuprous halide.

Our process is applicable to use of a wide variety of inert carrier materials in the preparation of solid-type cuprous halide reagents, any of those suggested in the prior art such as bauxite, pumice, fuller's earth, dry saw-dust, etc. being suitable. The concentration of cupric chloride solution used for impregnation is advantageously adapted to the type of carrier. Very concentrated solutions are satisfactory for carrier substances with a low adsorptive capacity for water, because a large amount of cupric halide can be added to the reagent without excessively wetting it. On the other hand, somewhat more dilute solutions may be used with those materials able to absorb larger amounts of water, in that the active reagent may be added more slowly, thereby producing a more uniform finished material. The solution used in each case should be that one which will produce the most uniform finished reagent, preferably containing about 20 to 50 per cent or more by weight of cupric halide. The most satisfactory results have been obtained when the moist carrier has been wet enough with the impregnating solution to form a compact mass, yet no visible water can be seen even when the material is tightly squeezed in the hand. When bauxite, alumina, silica gel, or other highly adsorbent material is used, the reagent usually contains between 20 and 30 per cent water at this stage. The moist cupric halide-containing material may then be sprayed with an aqueous solution of one of our preferred reducing agents or a hydrocarbon solution of mercaptan to obtain conversion of the cupric salt to the cuprous form. However, a preferable procedure is to first transfer the unreduced material to the reagent vessel where it is to be used, and then to pass the reducing agent such as sulfur dioxide or an inert gas containing the mercaptan through the reagent bed until substantially complete reduction has been obtained. Addition of the reducing agent is then discontinued, and in its place a stream of hot, dry non-oxidizing gas is passed until all excess reducing agent and water has been displaced.

An alternative procedure is to impregnate the carrier first with a solution of cupric sulfate, then spray the moist solid with a solution of alkali metal halide, generally sodium chloride. In this way cupric halide is metathetically formed in place on the surface and within the pore-spaces of the carrier. Reduction can be conducted as previously indicated.

Although either cupric chloride or bromide is chemically applicable, cupric chloride is preferable because of its cheapness and availability. Cupric iodide is less desirable because of side reactions occurring in its preparation.

The comparative aqueous solubilities of cupric halide and cuprous halide enables our process to lend itself especially well to production of cuprous halide slurries within a treating system. When a saturated solution of cupric halide is reduced, cuprous halide precipitates because it is much less soluble. By appropriate adjustment of the water volume and solution composition with regard to solutizing salts, either a slurry or a solution of cuprous halide may be produced by this method. We generally use a solution of the reducing agent for preparation of solutions or slurries, but intimate contacting of the cupric halide solution with a reducing gas will serve equally well.

It has been found that solid-type cuprous halide reagents prepared according to the above-described procedure are appreciably more active than those produced by other methods, presumably because of an increased surface area and freedom from surface oxidation. Thus mixtures of solid commercial grade cuprous halide with carriers or reagents prepared through repeated spraying and drying of a carrier usually exhibit lower activity and tend to absorb smaller total quantities of unsaturated hydrocarbons while allowing larger concentrations of same to pass through in the hydrocarbon fluid. Since the reagents prepared by this invention are not subject to an oxidizing atmosphere or to any mechanical degradation of the exposed cuprous halide surface, a higher degree of activity and more complete utilization are obtained.

The superior reagent qualities produced by the present process may likewise be extended to the reactivation of cuprous halide reagents which have become oxidized in service, or which have been prepared directly from solid cuprous chloride and have been more or less deactivated by oxidation and/or the mechanical features of the preparation. These and other obvious adaptations and modifications of the process will be obvious from the foregoing disclosure.

The fundamental principles involved in our invention are illustrated by the following typical procedures.

*Example 1*

Calcined bauxite, 20 to 60 mesh, was sprayed with a hot solution containing eight pounds of cupric chloride per gallon. The bauxite was stirred constantly while being sprayed. When sufficient solution had been added to the solid material to moisten it thoroughly, spraying was discontinued; at which time the reagent mixture was 55 per cent cupric chloride. The moist reagent was transferred to a tower, whose height was five times its diameter, and which was equipped with a perforated, supporting grid covered by a thin layer of coarse felt to prevent passage of the particles of solid reagent. This tower was also provided with a gas inlet line below the perforated plate and a discharge line at the top, internal cooling or heating coils, and a layer of efficient insulation on the outside. A gas mixture consisting of half hydrogen sulfide-free methane and half mixed ethyl and methyl mercaptans was passed through the reagent bed until substantially all of the cupric chloride had been converted to cuprous chloride. The flow of mercaptan-containing gas was discontinued, and a stream of similarly purified methane, heated to 250° F., was circulated through the reagent bed. Supplementary heat was furnished by passing steam through the internal heating coils. After the reagent had been substantially dehydrated and all excess mercaptan had been displaced, the flow of warm gas was discontinued, and the reagent bed was cooled to 40° F. by circulation of refrigerated brine through the system of internal coils in the tower. A stream of C4 hydrocarbon vapor containing 5.5 per cent butadiene was then passed through the reagent at a flow-rate of 60 gas volumes per volume of reagent per hour. At the end of three hours, the reagent bed had absorbed 90 per cent of its theoretical capacity of diolefin, based on the weight of cuprous chloride therein, and the stripped gas being discharged from the tower contained less than 0.5 per cent butadiene. Circulation of butadiene-containing hydrocarbon was stopped; the tower was flushed with warm methane while the temperature was raised, chiefly by circulation of steam through the internal coils. When the temperature has reached 175° F. and circulation of flush-gas was stopped, the gas being discharged as a result of heating the reagent was substantially pure butadiene. Ninety-five per cent of the butadiene absorbed by the reagent was recovered in 98 per cent purity.

After decomposition of the butadiene complex was substantially complete, the reagent tower was recooled to 40° F., and absorption of butadiene from the C4 mixture was recommenced.

*Example 2*

In a process using a cuprous chloride slurry for removal of butadiene, equivalent quantities of solutions of copper sulfate and sodium chloride were mixed in the slurry supply-tank. This tank, which was totally enclosed, was then flushed free of air with methane, and the contents were set in circulation by means of a small centrifugal pump, one inlet of which was connected to a tank containing a saturated solution of sodium bi-sulfite. When sufficient reducing agent had been added to convert all of the cupric chloride, addition was stopped, and excess solvent was drained from the slurry. After thoroughly flushing the tank and its contents with methane, the reagent slurry was ready for use in absorption of butadiene.

*Example 3*

Charcoal impregnated with 30 per cent by weight of cupric chloride was treated with a saturated solution of hydroxylamine hydrochloride. The cupric chloride was reduced to cuprous chloride, with the evolution of nitrogen. The reduced reagent was flushed with nitrogen at elevated temperature.

*Example 4*

Pumice soaked in cupric chloride solution was rapidly and completely reduced by treatment with a solution of hydrazine sulfate. The reagent was drained and dried in a stream of nitrogen to a substantially dry appearance, and contained about 20 per cent by weight of cuprous chloride based on the original weight of the pumice.

*Example 5*

Silica gel was impregnated with cupric bromide in two treatments with saturated aqueous solution producing a reagent containing 50 weight per cent of the cupric bromide. The reagent was reduced in a slow stream of sulfur dioxide to produce essentially cuprous bromide on the carrier.

*Example 6*

A reagent comprising essentially bauxite bearing 50 weight per cent of cuprous chloride became oxidized during handling so that no reaction with butadiene was possible. This reagent was restored to its initial activity by treatment with a slow stream of sulfur dioxide followed by flushing with nitrogen.

*Example 7*

A reagent prepared by intimately mixing cuprous chloride with fuller's earth had unsatisfactory activity. The reagent was activated by passage therethrough of a solution of methyl and ethyl mercaptans in hexane solution.

*Example 8*

Bauxite was impregnated with cupric chloride by spraying with hot saturated aqueous solution to form a reagent containing 40 weight per cent of the cupric salt. Substantial conversion of the cupric salt was obtained with hydrogen gas at about 400° F., but much of the copper was converted to the metallic state. In contrast, treatment of the bauxite-cupric chloride reagent with sulfur dioxide produced substantially quantitative conversion to the cuprous state.

We claim:

1. A process for the preparation of reagents containing cuprous halides and adapted for the separation of unsaturated hydrocarbons from hydrocarbon fluids containing the same, which comprises impregnating a solid adsorbent carrier with the corresponding cupric halide, and converting substantially all of the cupric halide to the corresponding cuprous halide by treatment with a reducing agent under conditions such that substantially no metallic copper is formed.

2. A process for the preparation of reagent compositions containing substantial proportions of a cuprous halide and adapted for the separation of unsaturated hydrocarbons from hydrocarbon fluids containing the same which comprises first preparing said reagent composition with the corresponding cupric halide, and subsequently converting substantially all of the cupric halide to the corresponding cuprous halide by treatment with a reducing agent under conditions such that substantially no metallic copper is formed.

3. A process as in claim 2 wherein the reducing treatment is effected at substantially atmospheric temperature and pressure.

4. A process as in claim 2 wherein the reducing agent comprises a fluid containing a readily-oxidizable sulfur compound, substantially free of hydrogen sulfide and salts thereof.

5. A process as in claim 2 wherein the reducing agent comprises a fluid containing a readily oxidizable nitrogen compound chosen from the group consisting of hydroxylamine and hydrazine.

6. In a process for the separation of unsaturated hydrocarbons from hydrocarbon fluids containing the same comprising contacting said fluids with a cuprous halide reagent to form cuprous halide-unsaturated hydrocarbon complex addition compounds, the improvement comprising formation of the cuprous halide reagent under non-oxidizing conditions within the system where it is to be used by reduction of the corresponding cupric halide substantially completely to the cuprous halide.

7. In a process for the separation of unsaturated hydrocarbons from hydrocarbon fluids containing same by contacting said fluids with a solid-type reagent comprising cuprous halide, the improvement comprising impregnating a substantially inert carrier with cupric halide, and converting substantially all of the cupric halide by use of a reducing agent to the corresponding cuprous halide under non-oxidizing conditions within the system where it is to be used.

8. In a process for the separation of diolefins from hydrocarbon fluids containing same by contacting said fluids with a solid-type reagent comprising cuprous chloride, the improvement comprising impregnating a substantially inert carrier with an aqueous cupric chloride solution, transferring the moist solid reagent to the reagent tower in which it is to be used, intimately contacting said moist reagent with a reducing gas until substantially all of the cupric chloride has been reduced to cuprous chloride, discontinuing the flow of reducing gas, and drying the reagent with sufficient hot, substantially inert gas to remove substantially all excess reducing agent prior to introduction of the hydrocarbon fluid.

9. A process as described in claim 8, wherein the reducing agent comprises sulfur dioxide.

10. A process as described in claim 8, in which the reducing agent comprises a low-boiling mercaptan.

WALTER A. SCHULZE.
LLOYD C. MORRIS.